United States Patent [19]

Chiang et al.

[11] Patent Number: 5,369,062

[45] Date of Patent: Nov. 29, 1994

[54] PROCESS FOR PRODUCING CERAMIC GLASS COMPOSITION

[75] Inventors: Joseph F. Chiang, Oneonta, N.Y.; Pinzhen Chen; You-wu Xu, both of Shanghai, China

[73] Assignee: The Research Foundation of State University of NY, Albany, N.Y.

[21] Appl. No.: 110,047

[22] Filed: Aug. 20, 1993

[51] Int. Cl.$^5$ .................................................. C03C 3/091
[52] U.S. Cl. .......................................... 501/63; 501/66; 501/70; 501/77; 501/27; 501/155
[58] Field of Search ..................... 501/63, 66, 70, 77, 501/27, 155

[56] References Cited

U.S. PATENT DOCUMENTS

| | | | |
|---|---|---|---|
| 3,097,954 | 7/1963 | Whitaker | 106/39 |
| 3,928,047 | 12/1975 | Kapolyi et al. | 106/39.6 |
| 4,414,013 | 11/1983 | Connell | 501/155 X |
| 4,522,926 | 6/1985 | Felice | 501/127 |
| 4,595,528 | 6/1986 | Greenhalgh | 252/629 |
| 4,632,687 | 12/1986 | Konkle et al. | 65/27 |
| 4,634,461 | 1/1987 | Demarest et al. | 65/27 |
| 4,772,431 | 9/1988 | Aubert | 252/629 |
| 4,820,325 | 4/1989 | Wheeler | 65/27 |
| 4,891,345 | 1/1990 | Nadkarni et al. | 501/155 |
| 4,983,549 | 1/1991 | Greve | 501/27 |
| 4,985,382 | 1/1991 | Nadkarni et al. | 501/155 |
| 5,092,932 | 3/1992 | Lerke et al. | 106/767 |
| 5,203,901 | 4/1993 | Suzuki et al. | 501/155 X |

FOREIGN PATENT DOCUMENTS

| | | |
|---|---|---|
| 85100521 | 8/1986 | China . |
| 56-5710-B | 2/1981 | Japan . |
| 60103-072 | 6/1985 | Japan . |
| 4254433-A | 9/1992 | Japan . |
| 4254436-A | 9/1992 | Japan . |
| 920609390B | 9/1992 | Japan . |
| 4338131-A | 11/1992 | Japan . |
| 92076939-B | 12/1992 | Japan . |
| 96406 | 7/1960 | Netherlands . |
| 8005-919 | 5/1982 | Netherlands . |
| 895945 | 1/1981 | U.S.S.R. . |
| 833824 | 5/1981 | U.S.S.R. . |
| 881042 | 11/1981 | U.S.S.R. . |
| 992475 | 1/1983 | U.S.S.R. . |
| 1671624-A1 | 8/1991 | U.S.S.R. . |
| 1701661-A1 | 12/1991 | U.S.S.R. . |

*Primary Examiner*—Karl Group
*Attorney, Agent, or Firm*—Heslin & Rothenberg

[57] ABSTRACT

A ceramic glass composition comprises: between about 35 and 55% by weight $SiO_2$; between about 18 and 28% by weight $Al_2O_3$; between about 1 and 5% by weight CaO; between about 7 and 14% by weight MgO; between about 0.5 and 5% by weight $TiO_2$; between about 0.4 and 3% by weight $B_2O_3$; and greater than 0 and up to about 1% by weight $P_2O_5$. A convenient source of raw materials is a mixture of coal ash waste, borax (or boric acid) manufacturing plant waste, and titanium pigment waste. The ceramic glass is formed from an intermediate ceramic mixture which is subjected to a heat treatment. The intermediate ceramic mixture is formed by heating a mixture containing $SiO_2$, $Al_2O_3$, CaO, MgO, $TiO_2$, $B_2O_3$, and $Na_4P_2O_7$ to a temperature between about 1400° and 1600° C.; cooling the mixture to solidify it; annealing the mixture at 600° to 670° C. in an atmosphere containing oxygen; and cooling the mixture to a temperature less than about 400° C. at a cooling rate less than about 30° C. per hour. The intermediate ceramic mixture is first heated to a temperature of between about 850° and 1000° C. at a heating rate of between about 1° and 2° C. per minute, and then sintered at a temperature between 850° to 1000° C. for a time period sufficient to increase its density to at least about 2.1 g/cm$^3$.

42 Claims, No Drawings

PROCESS FOR PRODUCING CERAMIC GLASS COMPOSITION

FIELD OF THE INVENTION

The present invention relates generally to a ceramic composition and, more specifically, to a relatively dense ceramic glass exhibiting high compressive and bending strength, high thermal resistance, and high resistance to acids and bases.

DESCRIPTION OF THE PRIOR ART

Ceramics are used in a variety of applications due to their relatively high thermal and chemical resistance. Such applications include, for example, use as containment walls for chemical reactors, and transfer tubing in chemical manufacturing plants. Some ceramics have been manufactured using waste products as a raw material to reduce the cost of the ceramic. In addition, there has recently been much interest in providing a market for a waste product, thereby reducing the volume of waste that must ultimately be disposed of. For example, coal ash, which is the waste from coal-fired electric power plants, has been used to manufacture cast stone for the building industry. However, existing ceramic products manufactured from coal ash waste have relatively low material strength, low scratch resistance, low acid/base resistance, low impact, and low thermal shock resistance, and, therefore, limited market value. Ceramic materials having improved mechanical properties could find applications as, for example, chemical laboratory counter tops and sandpaper.

Thus, there is a need for an inexpensive ceramic exhibiting improved strength, hardness, and chemical and mechanical resistance. There is also a need for a ceramic that can be produced from waste materials.

SUMMARY OF THE INVENTION

This need is satisfied, the limitations of the prior art overcome, and other benefits realized in accordance with the principles of the present invention by a ceramic composition comprising: between about 35 and 55% by weight $SiO_2$; between about 18 and 28% by weight $Al_2O_3$; between about 1 and 5% by weight CaO; between about 7 and 14% by weight MgO; between about 0.5 and 5% by weight $TiO_2$; between about 0.4 and 3% by weight $B_2O_3$; and greater than 0 and up to about 1% by weight $P_2O_5$.

The ceramic composition may further contain between about 2 and 11% by weight $Fe_2O_3$ and FeO in total, and between about 1 and 4% by weight of $K_2O$ and $Na_2O$ in total.

A variety of raw materials may be used according to the present invention. However, in one specific case, the $SiO_2$, $Al_2O_3$, and CaO are provided by coal ash waste, the MgO is provided by the coal ash waste and borax (or boric acid) manufacturing plant waste, the $TiO_2$ is provided by the coal ash waste and titanium pigment waste, the $B_2O_3$ is provided by the borax (or boric acid) manufacturing plant waste, and the $P_2O_5$ is provided by $Na_4P_2O_7$.

In one example the ceramic glass has the following properties: a density of about 2.6 g/cm³; a compressive strength of about 800 kg/cm²; a bending strength of about 937 kg/cm²; an impact resistance of 20 kg-cm/cm²; a thermal shock resistance of about 700° C.; and a Mohs hardness about the same as corundum.

The ceramic glass of the invention is produced by forming an intermediate ceramic mixture and then subjecting it to a heat treatment. The intermediate ceramic mixture is formed in a first approach by the following steps: providing an initial process mixture containing $SiO_2$, $Al_2O_3$, CaO, MgO, $TiO_2$, $B_2O_3$, and $Na_4P_2O_7$; heating the process mixture to a temperature between about 1400° and 1600° C.; cooling the process mixture from this temperature to a lower temperature sufficient to solidify the process mixture and less than about 650° C.; annealing the process mixture, following the step of cooling, at a temperature between about 600° and 670° C. in an atmosphere containing oxygen and for a time period greater than about 3.5 hours; and cooling the process mixture, following annealing, to a temperature less than about 400° C. at a cooling rate less than about 30° C. per hour. The process mixture may next be molded, as discussed below, or directly subjected to the heat treatment.

In a second approach the intermediate ceramic mixture is formed by a set of steps similar to the above. However, under the second approach, the $Na_4P_2O_7$ is added to the process mixture following the step of cooling to a temperature less than about 400° C. Further, before adding the $Na_4P_2O_7$, the process mixture is heated to a temperature greater than about 1300° C., but less than the temperature used in the step of heating the initial process mixture to a temperature between about 1400° and 1600° C. This is in contrast to the first approach in which the $Na_4P_2O_7$ is added to the initial process mixture.

Like the first approach, the process mixture may next be molded, as discussed further below, or directly subjected to the heat treatment. Where the process mixture is to be molded, the $Na_4P_2O_7$ addition can be performed either as a part of the heating of the process mixture in preparation for pouring into a mold or prior thereto.

In both the first and second approaches for forming the intermediate mixture, the process mixture may be molded to a desired shape prior to the heat treatment. However, in some applications this may not be necessary, and the process mixture is subjected to the heat treatment without any molding thereof. Where molding is performed, the process mixture is heated to a temperature sufficient to liquify the process mixture for pouring into a mold, but less than the temperature used in the step of heating the initial process mixture to a temperature between about 1400° and 1600° C.

After forming the intermediate ceramic mixture by the first or second approach discussed above (whether molded or not), the ceramic mixture is subjected to a heat treatment. The heat treatment increases the density of the intermediate ceramic mixture, which may initially, for example, have a density of less than about 2.1 g/cm³, to a density greater than, for example, about 2.5 g/cm³. The heat treatment has two steps. In the first step, the ceramic mixture is heated to a temperature of between about 850° and 1000° C. at a heating rate of between about 1° and 2° C. per minute. In the second step, the ceramic mixture is sintered at a temperature between about 850° and 1000° C. for a time period sufficient to increase the density of the ceramic mixture to at least about 2.1 g/cm³.

The ceramic glass of the present invention has improved hardness, chemical resistance, thermal shock resistance, and material strength relative to conventional ceramics. Other advantages of the present invention include improved impact resistance and compressive strength.

The foregoing and other objects, features, and advantages of the invention will be apparent from the following more particular description of a preferred embodiment of the invention.

BEST MODE FOR CARRYING OUT THE INVENTION

The properties and formation of a ceramic according to the present invention are described below. Thereafter, additional description is provided on some uses and applications for this ceramic.

I. Properties of the Final Ceramic Product

The final ceramic product (hereinafter referred to as the ceramic glass) formed according to the present invention has a composition comprising: between about 35 and 55% by weight $SiO_2$; between about 18 and 28% by weight $Al_2O_3$; between about 1 and 5% by weight CaO; between about 7 and 14% by weight MgO; between about 0.5 and 5% by weight $TiO_2$; between about 0.4 and 3% by weight $B_2O_3$; and greater than 0 and up to about 1% by weight $P_2O_5$. These are the components of the ceramic glass necessary to provide a product having useful properties. The $B_2O_3$ in the ceramic glass improves the hardness of the material, and the $P_2O_5$ reduces the viscosity of the process mixture during the molding process.

Other components, however, may be present in the ceramic glass without substantially affecting its properties. For example, the ceramic glass may further contain between about 2 and 11% by weight $Fe_2O_3$ and FeO in total, and between about 1 and 4% by weight of $K_2O$ and $Na_2O$ in total. In addition, many other inert components may be present in the final ceramic glass, and it is expected that their presence will not substantially affect the properties of the ceramic glass. These additional components are sometimes present in the final ceramic glass simply by virtue of their presence in one of the initial raw materials.

In general, a variety of raw materials may be used to form the ceramic glass. Specific examples of raw materials that may be used are discussed further herein. In the preferred embodiment, the $P_2O_5$ is provided from a raw material of $Na_4P_2O_7$ since $P_2O_5$ has a relatively low boiling point and would otherwise evaporate during processing.

In one specific case, which is advantageous because it allows the recycling of some industrial waste products, the $SiO_2$, $Al_2O_3$, and CaO may be provided by coal ash waste, the MgO may be provided by the coal ash waste and borax (or boric acid) manufacturing plant waste (the borax waste may be either solid or mud waste), the $TiO_2$ may be provided by the coal ash waste and titanium pigment waste, the $B_2O_3$ may be provided by the borax (or boric acid) manufacturing plant waste. Note, as mentioned above, that the $P_2O_5$ is provided by $Na_4P_2O_7$. The use of these wastes as raw materials and the processing steps for forming the ceramic glass are discussed further below. When coal ash waste is used as a raw material, $Fe_2O_3$, FeO, $K_2O$, and $Na_2O$, are also components of the final ceramic glass because of their initial presence in the coal ash waste used as a raw material.

Although the ceramic according to the present invention is referred to as a "ceramic glass", the scope of the present invention is not intended to be limited by the use of the word "glass". Instead, the term "ceramic glass" is merely a shorthand way to describe the ceramic according to the present invention in terms of some of its properties. For example, the ceramic according to the present invention is neither crystalline nor polycrystalline as has been determined by electron diffraction, but is instead an amorphous solid similar in some micro-structural aspects to silicate glass. The ceramic glass does not have a single, fixed melting point, but rather starts melting between about 800° and 900° C. In addition, the ceramic glass is referred to as a ceramic because its major constituents are metallic oxides.

The ceramic glass exhibits several desirable properties such as improved mechanical strength, acid and base resistance, and hardness relative to conventional ceramics. More specifically, as a nonlimiting example, one ceramic glass was formed with the following properties:

a density of about 2.6 $g/cm^3$;
a compressive strength of about 800 $kg/cm^2$;
a bending strength of about 937 $kg/cm^2$;
a thermal shock resistance of about 700° C.;
a Mohs hardness of about 9;
an acid resistance of 99% against 98% $H_2SO_4$, and 96% against 20% $H_2SO_4$;
an alkaline resistance of 98% against 20% NaOH; and
an impact resistance of 20 $kg-cm/cm^2$.

More generally, other ceramic glasses have exhibited the following properties:

a density of about 2.1 to 2.6 $g/cm^3$;
a compressive strength of about 700 to 800 $kg/cm^2$;
a bending strength of about 900 to 937 $kg/cm^2$;
a thermal shock resistance of about 600° to 750° C.; and
a Mohs hardness of about 8 to 9.

With respect to the Mohs hardness above, corundum is defined to have a hardness value of 9 and diamond a hardness value of 10. The mechanical tests above are standard tests in the art of materials testing. The acid and base resistance tests are conducted in accordance with ASTM standards.

Where the ceramic glass is manufactured with the above-described waste materials (specifically, including coal ash), its color is black. It is believed that this black color is due to the iron oxides from the coal ash that are present in the final ceramic glass product. This hypothesis is supported by the formation of a white ceramic glass containing the necessary components described above, but lacking iron oxides.

II. Formation of the Ceramic Glass

The ceramic glass is produced, first, by forming an intermediate ceramic mixture and, second, by subjecting the intermediate mixture to a heat treatment. There are two approaches for forming the intermediate ceramic mixture. These are discussed in turn below, followed by a discussion of the heat treatment.

First Approach for Forming the Intermediate Ceramic Mixture

For both the first and second approaches, the intermediate ceramic mixture formed must contain the following critical components in substantially the same percentages as in the final ceramic glass: $SiO_2$, $Al_2O_3$, CaO, MgO, $TiO_2$, $B_2O_3$, and $P_2O_5$. In the first step of the first approach, the raw materials are combined to provide a process mixture comprising the following critical components: $SiO_2$, $Al_2O_3$, CaO, MgO, $TiO_2$, $B_2O_3$, and $Na_4P_2O_7$. These components are combined as necessary so that the intermediate ceramic mixture substantially will contain the critical component percentages described above for the final ceramic glass. Some $Na_4P_2O_7$ must be added to the process mixture to provide the $P_2O_5$ in the final ceramic glass, and in general $Na_4P_2O_7$ forms up to about 2% by weight thereof. The $Na_4P_2O_7$ also reduces the viscosity of the process mixture during the molding process. This assists in pouring the mixture for molding. The process mixture may contain other components in addition to the critical components so long as the above relative proportions for the critical components are substantially not changed.

In one example, coal ash waste, borax manufacturing plant waste, titanium pigment waste, and $Na_4P_2O_7$ are used as raw materials. The coal ash waste, which is typically produced by coal-fired electric power plants, forms 70% by weight of the process mixture. The borax manufacturing plant waste forms about 26% by weight thereof, and the titanium pigment waste forms about 3.7% by weight thereof. About 0.3% by weight of $Na_4P_2O_7$ is also added.

The coal ash waste typically contains $SiO_2$, $Al_2O_3$, $CaO$, $MgO$, $TiO_2$, $Fe_2O_3$, $FeO$, $K_2O$, and $Na_2O$. Because the coal ash waste does not usually contain sufficient $MgO$ for the ceramic glass, the borax manufacturing plant waste, which contains between about 30 and 40% by weight $MgO$, is an additional source of $MgO$ for the ceramic glass. Also, the titanium pigment waste, which contains between about 5 and 15% by weight $TiO_2$, is used as a second source of $TiO_2$.

Several types of coal ash waste may be used. One specific example is brown coal ash waste. Brown coal is predominantly used in Europe and typically contains a greater proportion of $CaO$ than coal in the United States. However, this is not expected to affect the practice of the invention as long as the final proportion of $CaO$ in the ceramic glass falls within the ranges above.

After mixing the raw materials, the process mixture is heated to a temperature generally between about 1400° and 1600° C., and more preferably between 1400° and 1500° C. The optimum temperature range is between about 1430° and 1470° C.

Next, the process mixture is cooled to a temperature sufficiently low to solidify the process mixture so as to produce a substantially uniform product. This temperature is generally less than about 650° C., and more preferably about room temperature.

After the cooling above, the process mixture is annealed at a temperature between about 600° and 670° C., and more preferably about 650° C. The annealing time period is generally greater than about 3.5 hours, and more preferably between about 3.5 and 4.5 hours. During annealing, the process mixture is exposed to an oxygen-containing ambient so that all critical components are in the form of oxides.

Following annealing, the process mixture is cooled to temperature generally less than about 400° C., and more preferably less than about 300° C. This cooling is performed from the annealing temperature at a rate generally less than about 30° C. per hour, and more preferably between about 15° and 25° C. per hour. The process mixture at this point has a fixed shape and is substantially a single piece of material. Cooling rates greater than about 30° C. per hour or less than about 15° C. per hour will result in a less dense product.

Next, the process mixture may either be directly subjected to a heat treatment or be molded prior thereto. If molded, the process mixture is heated to a molding temperature generally sufficient to liquify the process mixture for pouring into a mold, but less than the temperature between 1400° and 1600° C. used for heating the initial process mixture above. More preferably the molding temperature is less than about 1400° C., and most preferably is between about 1360° and 1400° C. Prior to molding, the process mixture may be cooled to about room temperature following annealing above. However, this is not necessary. Following molding, the process mixture is subjected to the heat treatment described below.

Second Approach for Forming the Intermediate Ceramic Mixture

The second approach for forming the intermediate ceramic mixture is substantially similar to the first approach except that the $Na_4P_2O_7$ is added closer to the molding step (or the heat treatment where no molding is performed). For convenience much of the process description for the first approach is presented again below, as modified where appropriate.

In the first step of the second approach, the raw materials are combined to provide a process mixture comprising the following critical components: $SiO_2$, $Al_2O_3$, $CaO$, $MgO$, $TiO_2$, and $B_2O_3$. Note that. $Na_4P_2O_7$ is not added at this point. As in the first approach, the process mixture may use a variety of raw materials and contain other components in addition to the critical components.

After mixing the raw materials, the process mixture is heated to a temperature generally between about 1400° and 1600° C., and more preferably between 1400° and 1500° C. The optimum temperature range is between about 1430° and 1470° C.

Next, the process mixture is cooled to a temperature sufficiently low to solidify the process mixture. This temperature is generally less than about 650° C., and more preferably about room temperature.

After the cooling above, the process mixture is annealed at a temperature between about 600° and 670° C., and more preferably about 650° C. The annealing time period is generally greater than about 3.5 hours, and more preferably between about 3.5 and 4.5 hours. During annealing, the process mixture is exposed to an oxygen-containing atmosphere.

Following annealing, the process mixture is cooled to a temperature generally less than about 400° C., and more preferably less than about 300° C. This cooling is performed from the annealing temperature at a rate generally less than about 30° C. per hour, and more preferably between about 15° and 25° C. per hour. The process mixture at this point has a fixed shape and is substantially a single piece of material.

Next, as in the first approach, the process mixture may either be directly subjected to a heat treatment or be molded prior thereto. However, for the second approach, it is necessary to add $Na_4P_2O_7$ following the above step of cooling after annealing, whether there will be molding or not. The $Na_4P_2O_7$ is added to the process mixture at a temperature generally greater than about 1300° C., and more preferably greater than about 1350° C., but less than the temperature between 1400° and 1600° C. used for heating the initial process mixture above. Where molding will be performed, the $Na_4P_2O_7$ can be added during the heating in preparation for molding. Some $Na_4P_2O_7$ must be added to the process mixture to provide the $P_2O_5$ in the final ceramic glass. Generally, up to about 2% by weight of $Na_4P_2O_7$ is added to the process mixture, and more preferably about 0.3% is added. The $Na_4P_2O_7$ also reduces the viscosity of the process mixture during the molding process to make the mixture easier to pour into a mold.

If the process mixture will be molded, it is heated to a molding temperature generally sufficient to liquify the process mixture for pouring into a mold, but less than the temperature between 1400° and 1600° C. used for heating the initial process mixture above. More preferably the molding temperature is less than about 1400° C., and most preferably is between about 1360° and 1400° C. Prior to molding, the process mixture may be cooled to about room temperature following annealing above. However, this is not necessary. Following molding, the process mixture is subjected to the heat treatment described below.

A non-limiting example of the composition of an intermediate ceramic mixture that has been formed is the following: 46.82% $SiO_2$, 26.66% $Al_2O_3$, 4.05% $Fe_2O_3$, 4.10% FeO, 2.37% CaO, 11.14% MgO, 0.71% $K_2O$, 0.96% $Na_2O$, 1.76% $TiO_2$, 0.89% $B_2O_3$, and 0.35% $P_2O_5$, all by weight. These percentages were determined by chemical analysis.

C. Heat Treatment of the Intermediate Ceramic Mixture to Produce Ceramic Glass

After forming the intermediate ceramic mixture by either the first or second approach discussed above, the ceramic mixture is subjected to a heat treatment. The heat treatment is important for increasing the density of the intermediate ceramic mixture. It is this increase in density which gives the final ceramic glass its most useful properties.

In general, the heat treatment has two steps. In the first step, the ceramic mixture is heated from a temperature generally less than 980° C., and more preferably less than 910° C., to a temperature of generally between about 850° and 1000° C., and more preferably between about 900° and 1000° C., at a heating rate of generally between about 1° and 2° C. per minute, and more preferably between about 1° and 1.5° C. per minute. The ceramic mixture may be heated from about room temperature, if desired, although a higher starting temperature, as just described, is acceptable.

In the second step, the ceramic mixture is sintered at a sintering temperature generally between about 850° and 1000° C., and more preferably between about 900° and 1000° C. The optimum sintering temperature is about 910° C. Prior to sintering, the ceramic mixture has a density of less than about 2.1 g/cm³. Sintering is performed for a time period sufficient to increase the density of the ceramic mixture to at least about 2.1 g/cm³, and more preferably at least about 2.5 g/cm³. The optimum density is about 2.6 g/cm³. This time period is generally between about 2.5 and 4.0 hours, and more preferably between about 2.5 and 3.0. The optimum time period is about 3 hours. Time periods longer than this were not found to substantially increase the density of the ceramic mixture. Time periods less than this were found to result in a lower density. The sintering temperature may be substantially the same as or different from the final temperature achieved following the first step of heating above.

After sintering, the ceramic mixture is cooled to a temperature generally less than about 910° C. The rate of cooling is not critical, and the mixture may also be allowed to cool to room temperature naturally.

III. EXAMPLES

The present invention is further illustrated in the examples given below. These examples are provided for the purpose of description, and the details provided therein are not intended to limit the scope of the present invention.

EXAMPLE 1

An initial process mixture was formed by mixing about 70% by weight of coal ash waste, about 25% by weight of solid borax manufacturing plant waste, about 4% by weight of waste from a titanium pigment manufacturing plant, and about 1% by weight of $Na_4P_2O_7$. After mixing, the composition of the mixture was as follows:

| Component | Percentage (by weight) |
|---|---|
| $SiO_2$ | 50 |
| $Al_2O_3$ | 23 |
| $Fe_2O_3$ and FeO | 8 |
| CaO | 3 |
| MgO | 10.5 |
| $K_2O$ | 1 |
| $Na_2O$ | 1 |
| $TiO_2$ | 2 |
| $B_2O_3$ | 0.9 |
| $P_2O_5$ (as a component of $Na_4P_2O_7$) | 0.3 |

An intermediate ceramic mixture was then formed as follows: the process mixture was heated from room temperature to 1500° C., annealed at 600° C. for 5 hours, cooled to 300° C. at 20° C. per hour (this took about 15 hours), and then cooled from 300° C. to room temperature. A ceramic glass was then formed as follows: the intermediate ceramic mixture was heated to 950° C. at 1.0° C. per minute, sintered at 950° C. for 2.5 hours, and then cooled to room temperature. The ceramic glass thus formed had properties similar to those described above.

EXAMPLE 2

An initial process mixture was formed by mixing about 70% by weight of coal ash waste, about 25% by weight of solid borax manufacturing plant waste, about 4% by weight of waste from a titanium pigment manufacturing plant, and about 1% by weight of $Na_4P_2O_7$. After mixing, the composition of the mixture was as follows:

| Component | Percentage (by weight) |
|---|---|
| $SiO_2$ | 52 |
| $Al_2O_3$ | 20 |
| $Fe_2O_3$ and FeO | 9 |
| CaO | 3.5 |
| MgO | 10.0 |
| $K_2O$ | 1 |
| $Na_2O$ | 1 |
| $TiO_2$ | 2 |
| $B_2O_3$ | 0.9 |
| $P_2O_5$ (as a component of $Na_4P_2O_7$) | 0.3 |

An intermediate ceramic mixture was then formed as follows: the process mixture was heated from room temperature to 1500° C., annealed at 650° C. for 4 hours, cooled to 300° C. at 20° C. per hour, and then cooled from 300° C. to room temperature. A ceramic glass was then formed as follows: the intermediate ceramic mixture was heated to 910° C. at 1.5° C. per minute, sintered at 910° C. for 3.0 hours, and then cooled to room temperature. The ceramic glass thus formed had properties similar to those described above.

EXAMPLE 3

An initial process mixture was formed by mixing about 70% by weight of coal ash waste, about 25% by weight of solid borax manufacturing plant waste, about 4% by weight of waste from a titanium pigment manufacturing plant, and about 1% by weight of $Na_4P_2O_7$. After mixing, the composition of the mixture was as follows:

| Component | Percentage (by weight) |
| --- | --- |
| $SiO_2$ | 50 |
| $Al_2O_3$ | 25 |
| $Fe_2O_3$ and FeO | 8 |
| CaO | 2.5 |
| MgO | 9.0 |
| $K_2O$ | 1 |
| $Na_2O$ | 1 |
| $TiO_2$ | 2 |
| $B_2O_3$ | 0.9 |
| $P_2O_5$ (as a component of $Na_4P_2O_7$) | 0.3 |

An intermediate ceramic mixture was then formed as follows: the process mixture was heated from room temperature to 1450° C., annealed at 650° C. for 4 hours, cooled to 300° C. at 20° C. per hour, and then cooled from 300° C. to room temperature. A ceramic glass was then formed as follows: the intermediate ceramic mixture was heated to 910° C. at 1.0° C. per minute, sintered at 910° C. for 3.0 hours, and then cooled to room temperature. The ceramic glass thus formed had properties similar to those described above.

EXAMPLE 4

An initial process mixture was formed by mixing about 70% by weight of coal ash waste, about 25% by weight of solid borax manufacturing plant waste, about 4% by weight of waste from a titanium pigment manufacturing plant, and about 1% by weight of $Na_4P_2O_7$. After mixing, the composition of the mixture was as follows:

| Component | Percentage (by weight) |
| --- | --- |
| $SiO_2$ | 53 |
| $Al_2O_3$ | 22 |
| $Fe_2O_3$ and FeO | 8 |
| CaO | 3 |
| MgO | 8 |
| $K_2O$ | 1 |
| $Na_2O$ | 1 |
| $TiO_2$ | 2.5 |
| $B_2O_3$ | 1.0 |
| $P_2O_5$ (as a component of $Na_4P_2O_7$) | 0.25 |

An intermediate ceramic mixture was then formed as follows: the process mixture was heated from room temperature to 1500° C., annealed at 650° C. for 4.5 hours, cooled to 350° C. at 20° C. per hour, and then cooled from 350° C. to room temperature. A ceramic glass was then formed as follows: the intermediate ceramic mixture was heated to 950° C. at 1.5° C. per minute, sintered at 950° C. for 3.0 hours, and then cooled to room temperature. The ceramic glass thus formed had properties similar to those described above.

EXAMPLE 5

An initial process mixture was formed by mixing about 70% by weight of coal ash waste, about 25% by weight of solid borax manufacturing plant waste, about 4% by weight of waste from a titanium pigment manufacturing plant, and about 1% by weight of $Na_4P_2O_7$. After mixing, the composition of the mixture was as follows:

| Component | Percentage (by weight) |
| --- | --- |
| $SiO_2$ | 40 |
| $Al_2O_3$ | 25 |
| $Fe_2O_3$ and FeO | 8.5 |
| CaO | 5 |
| MgO | 10 |
| $K_2O$ | 1.5 |
| $Na_2O$ | 2.5 |
| $TiO_2$ | 3.5 |
| $B_2O_3$ | 3.0 |
| $P_2O_5$ (as a component of $Na_4P_2O_7$) | 0.5 |

An intermediate ceramic mixture was then formed as follows: the process mixture was heated from room temperature to 1400° C., annealed at 650° C. for 4 hours, cooled to 350° C. at 20° C. per hour, and then cooled from 350° C. to room temperature. A ceramic glass was then formed as follows: the intermediate ceramic mixture was heated to 910° C. at 1.5° C. per minute, sintered at 910° C. for 3.0 hours, and then cooled to room temperature. The ceramic glass thus formed had properties similar to those described above.

IV. Uses and Applications of the Ceramic Glass

The ceramic glass according to the present invention has a number of useful applications. The following are a representative sample of such applications:
  laboratory counter tops;
  sandpaper and other grits;
  wear-resistant artificial stones including decorative stones;
  chemical reaction stills;
  fluid transfer tubing;
  replacements for cast iron or steel piping and glass fiber;
  matrix composites for manufacturing glass steel in, for example, cooling towers and yacht bodies;
  glassware;
  abrasive resistant liners;
  glasswares and methods of coloring same;
  replacements for aluminum or aluminum alloys in, for example, construction frameworks; and
  solar energy absorption elements.

Although the present invention has been described in detail above, it is not intended to be limited to the specific form set forth herein, but, on the contrary, it is intended to cover such alternatives and equivalents as can reasonably be included within the spirit and scope of the invention as defined by the appended claims.

For example, in other embodiments according to the present invention, the color of the ceramic mixture could be changed by adding a variety of oxides, depending upon the particular color desired. Also, the hardness could be reduced by decreasing either the $B_2O_3$ or $TiO_2$ components.

We claim:

1. A process for producing an amorphous ceramic glass, comprising the steps of:

forming an intermediate ceramic mixture comprising $SiO_2$, $Al_2O_3$, $CaO$, $MgO$, $TiO_2$, $B_2O_3$, and $P_2O_5$; and subjecting said ceramic mixture to a heat treatment comprising the steps of:

heating said ceramic mixture to a first ceramic mixture heating temperature of between about 850° and 1000° C. at a heating rate of between about 1° and 2° C. per minute; and sintering said ceramic mixture at a sintering temperature between about 850° and 1000° C. for a time period sufficient to increase the density of said ceramic mixture to at least about 2.1 g/cm³.

2. The process of claim 1 wherein said ceramic mixture is heated to said first ceramic mixture heating temperature from about room temperature.

3. The process of claim 1 wherein said first ceramic mixture heating temperature is between about 900° and 1000° C.

4. The process of claim 1 wherein said heat treatment further comprises the step of cooling said ceramic mixture to a temperature less than about 910° C. following said heat treatment.

5. The process of claim 1 wherein said sintering temperature is between about 900° and 1000° C.

6. The process of claim 1 wherein said time period is between about 2.5 and 4 hours.

7. The process of claim 1 wherein said ceramic mixture comprises:

between about 35 and 55% by weight $SiO_2$;
   between about 18 and 28% by weight $Al_2O_3$;
   between about 1 and 5% by weight $CaO$;
   between about 7 and 14% by weight $MgO$;
   between about 0.5 and 5% by weight $TiO_2$;
   between about 0.4 and 3% by weight $B_2O_3$; and
   greater than 0 and up to about 1% by weight $P_2O_5$.

8. The process of claim 1 wherein said heating rate is between about 1° and 1.5° C. per minute.

9. The process of claim 7 wherein said ceramic mixture has a density greater than about 2.5 g/cm³ following said heat treatment.

10. The process of claim 1 wherein said step of forming an intermediate ceramic mixture comprises the steps of:

providing a process mixture comprising $SiO_2$, $Al_2O_3$, $CaO$, $MgO$, $TiO_2$, $B_2O_3$, and $Na_4P_2O_7$; and heating said process mixture to a first intermediate forming temperature between about 1400° and 1600° C.;

cooling said process mixture from said first intermediate forming temperature to a second intermediate forming temperature sufficient to solidify said process mixture and less than about 650° C.;

annealing said process mixture, following said step of cooling from said first intermediate forming temperature, at an annealing temperature between about 600° and 670° C. in an atmosphere containing oxygen and for a time period greater than about 3.5 hours; and cooling said process mixture from said annealing temperature to a third intermediate forming temperature less than about 400° C. at a cooling rate less than about 30° C. per hour.

11. The process of claim 10 wherein said first intermediate forming temperature is between about 1400° and 1500° C.

12. The process of claim 10 wherein said cooling rate is between about 15° to 25° C. per hour.

13. The process of claim 10 wherein said third intermediate forming temperature is about 300° C.

14. The process of claim 10 wherein said first intermediate forming temperature is between about 1430° and 1470° C.

15. The process of claim 10 wherein said second intermediate forming temperature is about room temperature.

16. The process of claim 10 wherein said step of annealing is for a time period between about 3.5 and 4.5 hours.

17. The process of claim 10 wherein said process mixture comprises coal ash waste; a waste material comprising borax or boric acid manufacturing plant waste; and titanium pigment waste.

18. The process of claim 10 wherein said process mixture further comprises between about 1 and 4% by weight of $K_2O$ and $Na_2O$ in total.

19. The process of claim 18 wherein said process mixture further comprises between about 2 and 11% by weight $Fe_2O_3$ and $FeO$ in total.

20. The process of claim 10 wherein said annealing temperature is about 650° C.

21. The process of claim 10 further comprising the step of molding said process mixture at a molding temperature sufficient to liquify said process mixture for pouring into a mold but less than said first intermediate forming temperature, said step of molding following said step of cooling from said annealing temperature.

22. The process of claim 2 wherein said molding temperature is less than about 1400° C.

23. The process of claim 22 wherein said molding temperature is between about 1360° and 1400° C.

24. The process of claim 21 further comprising the step of cooling said process mixture to about room temperature following said step of cooling from said annealing temperature but prior to said step of molding.

25. The process of claim 10 wherein said process mixture comprises:

between about 35 and 55% by weight $SiO_2$;
    between about 18 and 28% by weight $Al_2O_3$;
    between about 1 and 5% by weight $CaO$;
    between about 7 and 14% by weight $MgO$;
    between about 0.5 and 5% by weight $TiO_2$;
    between about 0.4 and 3% by weight $B_2O_3$; and
    greater than 0 and up to about 2% by weight $Na_4P_2O_7$.

26. The process of claim 1 wherein said step of forming an intermediate ceramic mixture comprises the steps of:

providing a process mixture comprising $SiO_2$, $Al_2O_3$, $CaO$, $MgO$, $TiO_2$, and $B_2O_3$;

heating said process mixture to a first intermediate forming temperature between about 1400° and 1600° C.;

cooling said process mixture from said first intermediate forming temperature to a second intermediate forming temperature sufficient to solidify said process mixture and less than about 650° C.;

annealing said process mixture, following said step of cooling from said first intermediate forming temperature, at an annealing temperature between about 600° and 670° C. in an atmosphere containing oxygen and for a time period greater than about 3.5 hours;

cooling said process mixture from said annealing temperature to a third intermediate forming temperature less than about 400° C. at a cooling rate less than about 30° C. per hour; and adding $Na_4P_2O_7$ to said process mixture at a fourth intermediate forming temperature greater than about 1300° C. but less than said first intermediate forming temperature.

27. The process of claim 26 wherein said fourth intermediate forming temperature is greater than about 350° C. but less than said first intermediate forming temperature.

28. The process of claim 26 wherein said first intermediate forming temperature is between about 1400° and 1500° C.

29. The process of claim 26 wherein said cooling rate is between about 15° and 25° C. per hour.

30. The process of claim 26 wherein said third intermediate forming temperature is about 300° C., 31. The process of claim 26 wherein said first intermediate forming temperature is between about 1430° and 1470° C.

32. The process of claim 26 wherein said second intermediate forming temperature is about room temperature.

33. The process of claim 26 wherein said step of annealing is for a time period between about 3.5 and 4.5 hours.

34. The process of claim 26 wherein said process mixture comprises coal ash waste; a waste material comprising borax or boric acid manufacturing plant waste; and titanium pigment waste.

35. The process of claim 26 wherein said process mixture further comprises between about 1 and 4% by weight of $K_2O$ and $Na_2O$ in total.

36. The process of claim 35 wherein said process mixture further comprises between about 2 and 11% by weight $Fe_2O_3$ and $FeO$ in total.

37. The process of claim 26 wherein said annealing temperature is about 650° C.

38. The process of claim 26 further comprising the step of molding said process mixture at a molding temperature sufficient to liquify said process mixture for pouring into a mold but less than said first intermediate forming temperature, said molding step following said step of cooling from said annealing temperature and performed with or following said step of adding $Na_4P_2O_7$.

39. The process of claim 38 wherein said molding temperature is less than about 1400° C.

40. The process of claim 39 wherein said molding temperature is between about 1360° and 1400° C.

41. The process of claim 38 further comprising the step of cooling said process mixture to about room temperature following said step of cooling from said annealing temperature but prior to said step of molding.

42. The process of claim 26 wherein said process mixture comprises:
between about 35 and 55% by weight $SiO_2$;
between about 18 and 28% by weight $Al_2O_3$;
between about 1 and 5% by weight CaO;
between about 7 and 14% by weight MgO;
between about 0.5 and 5% by weight $TiO_2$;
between about 0.4 and 3% by weight $B_2O_3$; and
greater than 0 and up to about 2% by weight $Na_4P_2O_7$.

* * * * *